United States Patent
Berkes et al.

(10) Patent No.: US 6,240,986 B1
(45) Date of Patent: Jun. 5, 2001

(54) RECREATIONAL VEHICLE SANITARY SEWER CONNECTOR

(76) Inventors: August A. Berkes, 122 Glenwood Dr., Fairfield Glade, TN (US) 38558; Hien Vody Vodinh, 644 Gulfwood Dr., Knoxville, TN (US) 37923

( * ) Notice: Subject to any disclaimer, the term of this patent is extended or adjusted under 35 U.S.C. 154(b) by 0 days.

(21) Appl. No.: 09/573,283

(22) Filed: May 18, 2000

Related U.S. Application Data

(63) Continuation-in-part of application No. 09/315,433, filed on May 20, 1999, now abandoned.

(51) Int. Cl.[7] ....................................................... B65B 1/04
(52) U.S. Cl. .............................. 141/346; 4/323; 251/328; 141/65; 141/301
(58) Field of Search ........................... 141/65, 346, 301; 137/554, 596, 899; 4/321, 323, 662; 251/328

(56) References Cited

U.S. PATENT DOCUMENTS

| | | | |
|---|---|---|---|
| 3,590,869 | * | 7/1971 | Von Linsowe ................. 137/614.03 |
| 4,550,453 | * | 11/1985 | Norman ................................. 4/323 |
| 4,913,398 | * | 4/1990 | Ziaylek, Jr. et al. .................. 251/87 |
| 5,078,180 | * | 1/1992 | Collins ................................ 137/899 |
| 5,154,397 | * | 10/1992 | Thomas et al. ...................... 251/328 |
| 5,445,190 | * | 8/1995 | Gunder ................................. 137/899 |
| 5,947,156 | * | 9/1999 | Tomczyk .............................. 137/899 |
| 5,971,005 | * | 10/1999 | McKiernan .......................... 137/205 |

* cited by examiner

*Primary Examiner*—Steven O. Douglas

(57) ABSTRACT

A connector assembly for a sewer pipe system of a recreational vehicle having a holding tank for waste and/or waste water and a discharge pipe having an outlet end through which waste and/or waste water is discharged from the holding tank utilizes an adapter body having a passageway therethrough and a closure member which is connected to the adapter body for movement across the passageway between closed and open positions. The adapter body is connectable to the discharge pipe of the sewer pipe system and also includes a cavity disposed to one side of the passageway so that the interior of the cavity is in communication with the interior of the passageway. Movement of the closure member between its open and closed positions moves the closure member at least partially into and out of the cavity. In addition, the body of the adapter defines an abutment surface which encircles the passageway therein and is arranged so as to face the closure member when the closure member is in its closed position, and the assembly includes a movable member which biases the closure member toward the abutment surface when the closure member is in its closed position to thereby seal the passageway of the adapter body.

20 Claims, 4 Drawing Sheets

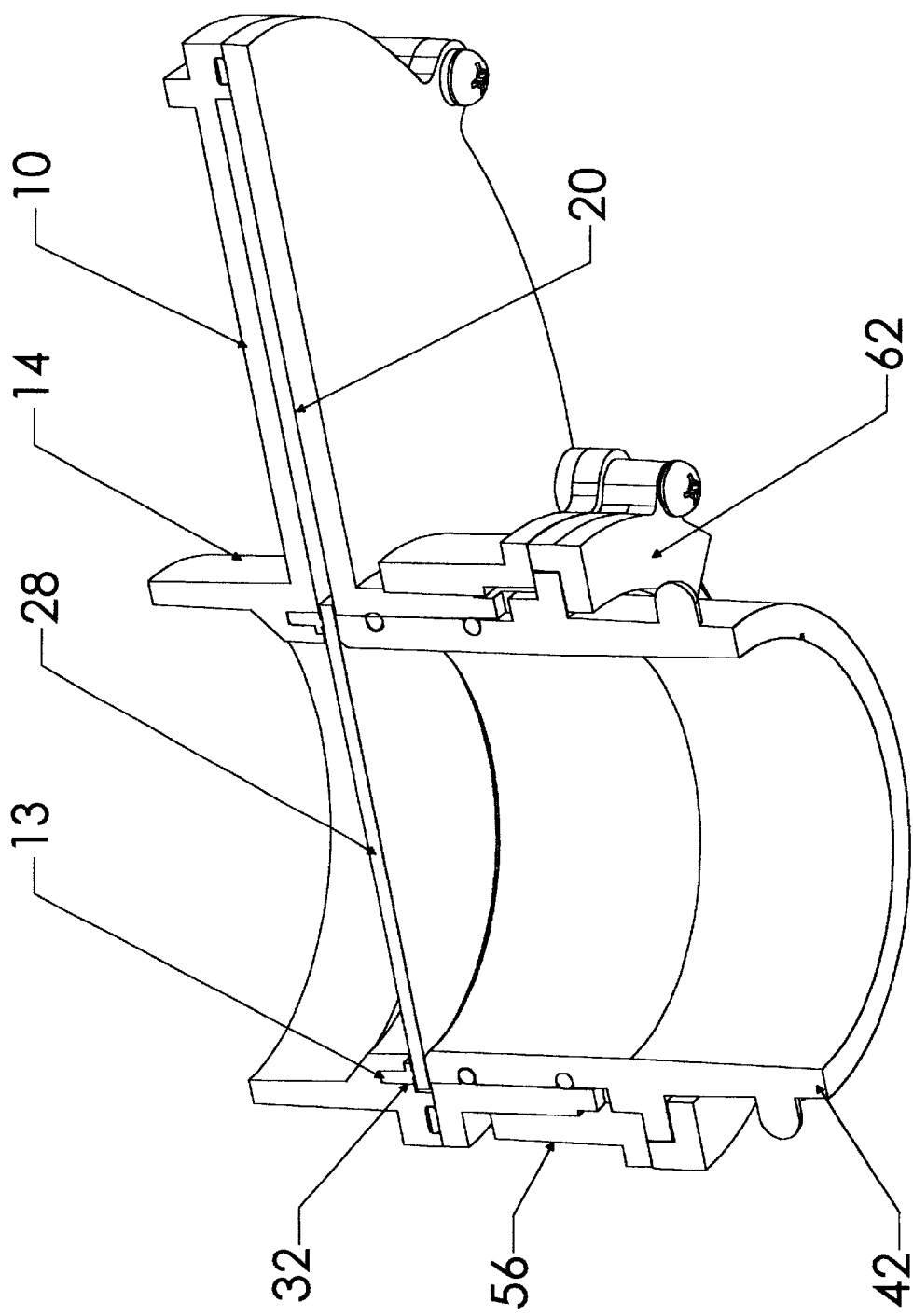

RECREATIONAL VEHICLE SANITARY SEWER CONNECTOR

This is a continuation-in-part of application Ser. No. 09/315,433 filed May 20, 1999, now abandoned and entitled "Recreational Vehicle Sanitary Sewer Connector", the disclosure of which is incorporated herein by reference.

BACKGROUND OF INVENTION

This invention relates generally to recreational vehicles and relates, more particularly, to the means and methods facilitating the dumping of recreational vehicle holding tanks containing sanitary sewage and/or gray water waste into a public sewer system.

Recreational vehicles, such as motor homes and travel camper units, are often equipped with holding tanks for waste and waste water and a sanitary sewer system enabling the holding tanks to be drained into a public sewer. For purposes of draining the holding tanks, the sanitary sewer system of the recreational vehicle can be connected (and, if desired, remain connected) by way of suitable hoses to the public sewer system. However, in order for the recreational vehicle to be moved from place to place, the sanitary sewer system must be disconnected from the public sewer and capped to prevent spillage of waste that may linger within the pipes of the system.

Commonly, the sanitary sewer system of the recreational vehicle is equipped with a discharge pipe having an outlet end through which the contents of the holding tanks are drained, and this outlet end is normally capped with an end cap and an attending sealing gasket. When it becomes necessary to dump the contents of the holding tanks or it becomes desirable to reconnect the outlet end to a public sewer, the end cap is removed, and a coupling accessory is connected to the outlet end for hook-up to a hose which leads to the public sewer. In some instances, such a hose is equipped with a suitable coupling accessory and the opposite end of the hose is insertable into an opening in the public sewer for drainage.

The removal of the end cap from the outlet end of the discharge pipe for connection to a hose and/or hose coupling accessory and the disconnection of the hose and/or hose coupling accessory from the discharge pipe commonly involves spillage of sewage waste or waste water from the sanitary sewer system. In particular, the sewage waste or waste water which is likely to spill from the sanitary sewer system is comprised of sewage waste or waste water which lingers within the piping of the sanitary sewer system during a tank-draining operation or seeps through worn valves associated with the holding tanks. Consequently, when the end cap or the hose and/or hose coupling accessory is removed (normally with the hands) from the outlet end of the discharge pipe, it is common for the unsanitary spillage to come into contact with the hands or fall onto the ground. It would be desirable to provide a means for preventing damage or harm which could result from spillage of the sewage waste or waste water during the connection or disconnection between the discharge pipe and a hose and/or hose coupling accessory.

Accordingly, it is an object of the present invention to provide a new and improved means for eliminating the spillage of waste or waste water when removing the cap from the outlet end of the discharge pipe for connection to a hose and/or hose coupling accessory or when disconnecting the hose and/or hose coupling accessory from the discharge pipe.

Another object of the present invention is to provide such a means which is easily and conveniently attached to the sewer pipe system of a recreational vehicle.

Still another object of the present invention is to provide such a means which is uncomplicated in structure yet effective in operation.

SUMMARY OF THE INVENTION

This invention resides in a connector assembly for a sewer pipe system of a recreational vehicle having a holding tank for waste and/or waste water and a discharge pipe having an outlet end through which waste and/or waste water is discharged from the holding tank.

The connector assembly includes an adapter body which is connectable to the discharge pipe of a sewer pipe system of a recreational vehicle and wherein the body includes a passageway through which waste and/or waste water can be conducted from the outlet end of the discharge pipe. The adapter body also includes a cavity disposed to one side of the passageway so that the interior of the cavity is in communication with the interior of the passageway. A closure member is connected to the body of the adapter for movement relative thereto between a closed position at which the passageway of the body is closed by the closure member and an open position at which The passageway of the body is open and the closure member is at least partially disposed within the cavity of the cavity-defining means. In addition, the body of the adapter defines an abutment surface which encircles the passageway therein and is arranged so as to face the closure member when the closure member is in its closed position. The assembly also includes means for biasing the closure member toward the abutment surface when the closure member is in its closed position to thereby seal the passageway of the adapter body.

In one embodiment of the assembly, the biasing means includes a movable member which is attached to the adapter body for movement toward and away from a side of the closure member opposite the abutment surface between a first condition at which the closure member is permitted to move between its open and closed positions unobstructed by the movable member and a second condition at which the movable member is positioned closer to the abutment surface. Therefore, when the closure member is positioned in its first position and the movable member is thereafter moved to its second condition, the closure member is urged by the movable member toward the abutment surface to thereby seal the passageway of the adapter body.

BRIEF DESCRIPTION OF THE DRAWINGS

FIG. 3A is an isometric section view of the present invention Connector Assembly with the closure in the closed position.

DETAILED DESCRIPTION OF AN ILLUSTRATED EMBODIMENT

Figure 1:
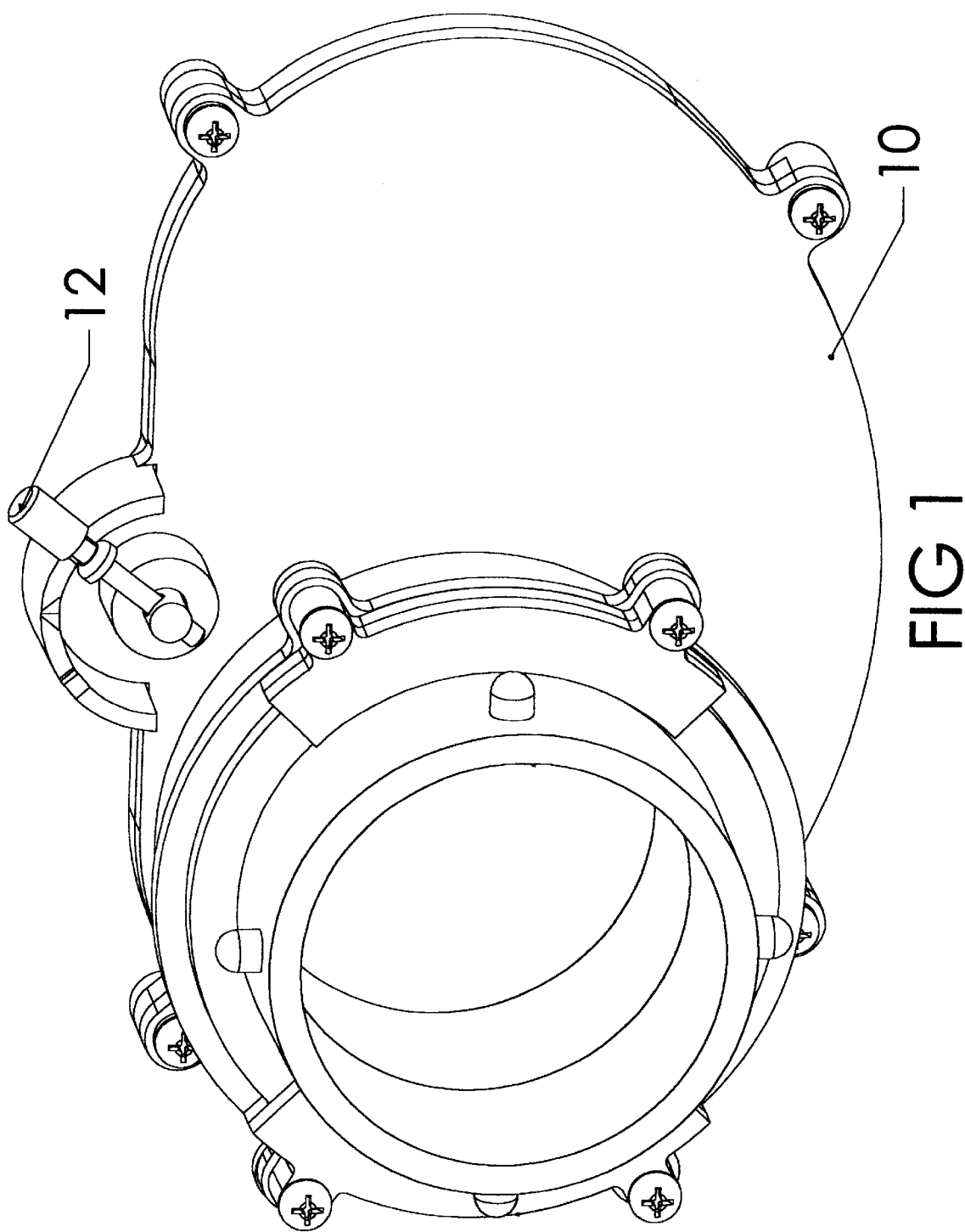
FIG. 1 is a perspective drawing of the present invention Connector Assembly.

FIG. 1 is an assembled perspective view of the present invention Connector Assembly, generally indicated 10. The operating lever 12 for moving the closure from closed to opened positions is indicated on FIG. 1. Materials for manufacture are primarily of durable molded materials except for gaskets, o-ring seats and mounting screws as required for assembly.

Figure 2:
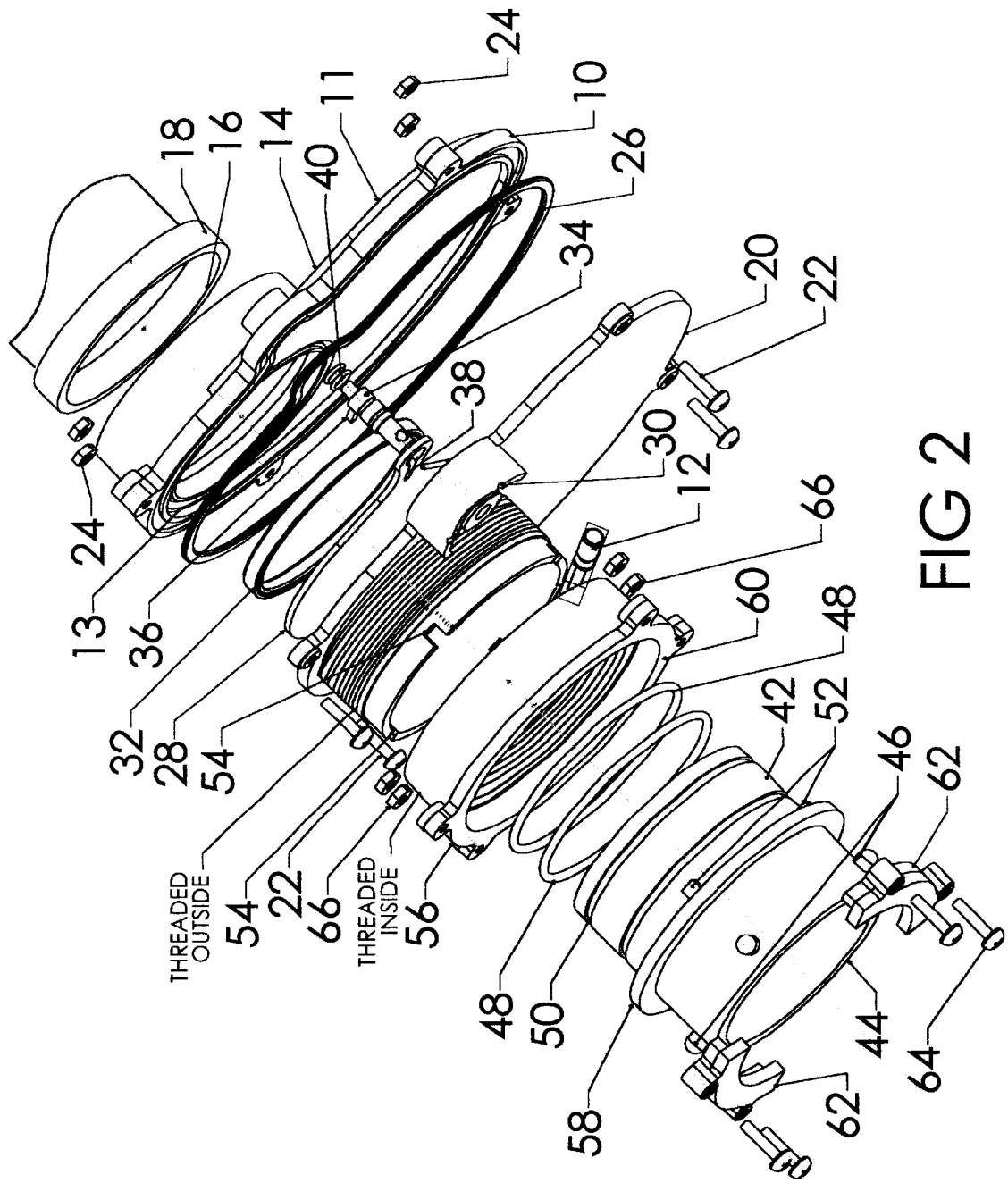
FIG. 2 is an exploded isometric assembly drawing of the present invention Connector Assembly showing all major components.

FIG. 2 is an exploded isometric assembly drawing of the present invention Connector Assembly 10 showing all major components. The upper housing 14 can be permanently attached to the outlet end 16 of the recreational vehicle (RV) sewer outlet pipe 18 with a solvent welded coupling. The outlet pipe 18 is normally capped with an end cap and a sealing gasket, but the use of the depicted connector assembly 10 obviates the need for such an end cap and gasket. A lower housing 20 is attached to the upper housing 14 with mounting bolts 22 and nuts 24. The upper housing 14 and lower housing are sealed together by a gasket 26 placed between the upper and lower housings. Installed between the upper housing 14 and lower housing 20 is a closure member 28 which can be moved between opened and closed positions by grasping and moving an external handle 12. The closure can be held in the opened or closed positions by handle detents 30 molded into the lower housing 20. To provide a seal with closure member 28 in the closed position, an internal sealing member 32 will be installed against an abutment surface 13 in the upper housing 14. Closure member 28 will then be pressed against the internal sealing member 32 which will provide a sealing pressure at abutment surface 13. The closure member 28 will be operated by the movement of handle 12, which is connected to shaft 34. The shaft 34 passes through closure member 28 and is keyed to the closure by a key 36 installed on shaft 34 and inserted in keyway 38 formed in closure member 28. The shaft 34 is sealed in the lower housing 20 by two o-rings 40. The adapter body, generally indicated 11, includes the assembled components of the upper housing 12, lower housing 20 and associated bolts, nuts, gaskets and o-rings.

A transition member 42 will be installed through the lower housing 20 as a vehicle to apply pressure on the closure member 28 to effect a tight seal when the closure member 28 is in the closed position. The transition member 42 also provides a point of connection for a flexible hose at the lower orifice 44 of the transition member for completion of the connection to the public sewer or dump station. Four protrusions 46 are molded on the transition coupling 42 to provide for attachment of bayonet type flexible hose connectors as presently manufactured and used as a standard of the recreational vehicle industry. The transition member 42 will have two o-rings 48 installed in o-ring depressions 50 on the portion fitting into the lower housing to effect a water tight seal between the two components. The transition member 42 will have four rectangular detents 52 molded on the exterior which will fit into guides 54 on the lower housing to hold the transition member in a fixed position to prevent rotational movement. The guides 54 on the lower housing will also permit movement of the transition member 42 along the cylindrical axis of the lower housing 20.

A movable member 56 threaded on the inside will screw on to the threaded portion of the lower housing 20. A flange 58 on the transition member 42 will mount against a lower flange 60 on the movable member 56 and be held in place by two cover brackets 62 which in turn are held in place by four bolts 64 and four nuts 66. With the cover brackets 62 mounted over the transition member flange 58, the movable member can be turned in a clockwise direction to advance the transition member 42 against closure member 28 with increasing pressure applied on closure member 28 as the lock bushing is turned. Increasing pressure applied to closure member 28 will transmit a sealing pressure of the closure member against the sealing member 32 and abutment surface 13 for a watertight seal. If the movable member 56 is turned in a counter clockwise direction, pressure against closure member 28 and subsequently against sealing member 32 is reduced to permit opening of closure member 28.

DESCRIPTION OF OPERATION

Figure 3B:
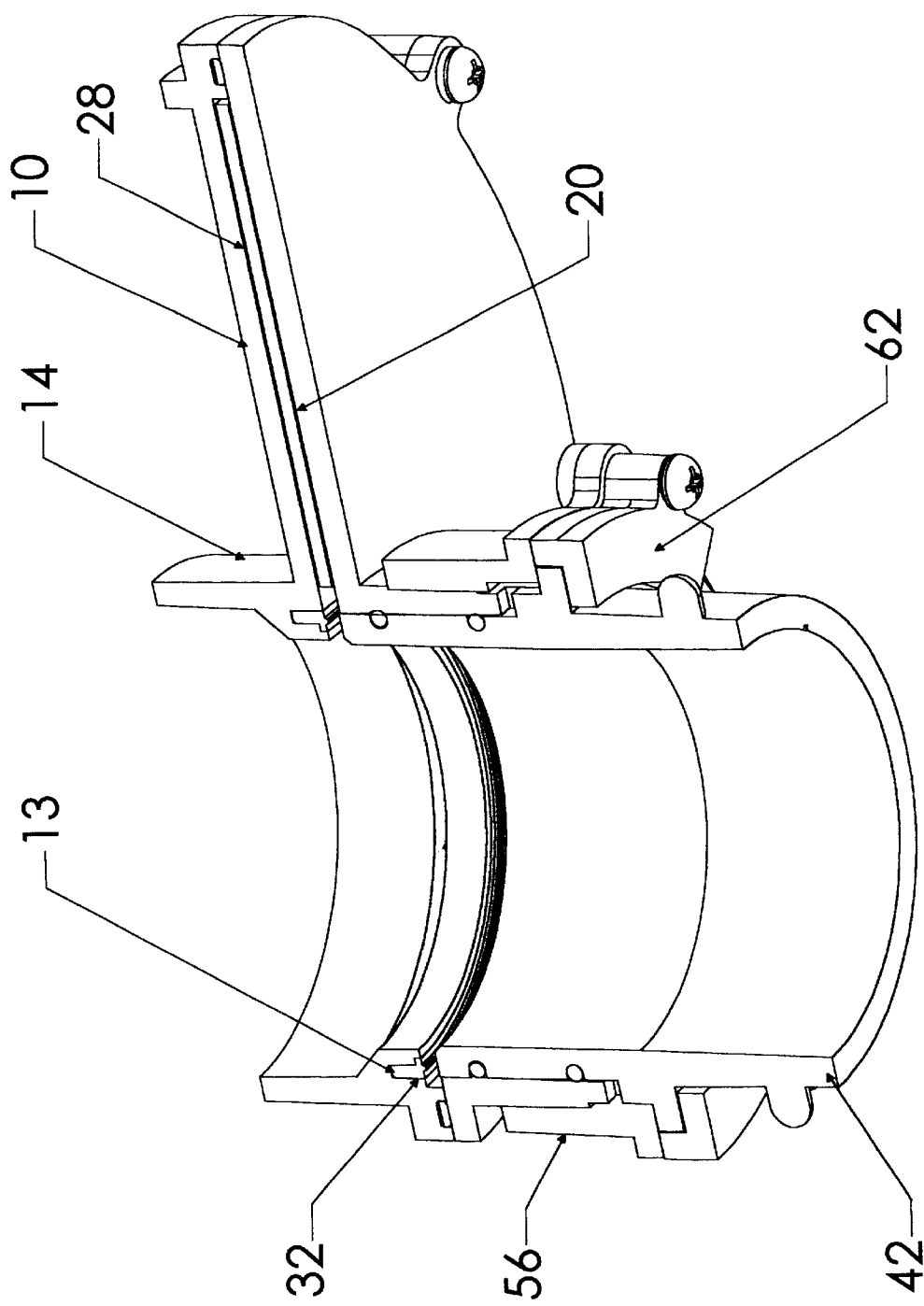
FIG. 3B is an isometric section view of the present invention Connector Assembly with the closure in the open position.

The manner of using the Recreational Vehicle Sanitary Sewer Connector to control the dumping of sewer wastes is predicated on Assembly 10 (FIG. 1) being permanently attached to the outlet end of the RV sewer pipe. When traveling or otherwise disconnected from a dump station or public sewer access, closure member 28 (FIG. 3A) would be in the closed and sealed position. At such time as it is desired to dump the RV sewage holding tanks at a dump station or public sewer access point, a flexible hose with standard coupling would be attached to the outlet end 44 (FIG. 2) of the transition member. After the flexible hose is attached, the movable member 56 would be turned in a counter-clockwise direction to relieve sealing pressure against closure member 28 by the transition member 42. After turning the movable member to relieve pressure on the closure member, handle 12 would be turned in a clockwise direction to move the closure member 28 from a closed position to an open position as shown on FIG. 3B. In the open position, closure member 28 would be held in the cavity between the upper housing 14 and the lower housing 20. With the closure member 28 in the open position, sewage would flow freely from the recreational vehicle holding tanks through the Sanitary Sewer Connector and on through the flexible sewer hose to the dumping station or public sewer system. When the RV holding tanks have been emptied, handle 12 can be turned in a counter-clockwise direction to place the closure member 28 in the closed position (FIG. 3A). With the closure member 28 in the closed position, the movable member 56 can then be turned in a clockwise direction which will apply pressure on the closure member 28 which in turn will apply additional pressure on the sealing member 32 (FIG. 2). With the closure member 28 in the closed position and sealed against abutment surface 13, the flexible hose can be disconnected from the transition coupling 42 and stored in the appropriate storage compartment of the recreational vehicle.

CONCLUSIONS, RAMIFICATIONS AND SCOPE

Accordingly, the reader will see that the Sewer Connector Assembly of this invention can be used as an improved means for connecting to and draining the contents of recreational vehicle sewer systems. By using this invention, an RV owner will be able to connect his/her unit to a public sewer or dump station without having to remove a cap from the outlet end of his/her sewer line before connecting a sewer hose to the RV unit. The operation of opening and closing of the sewer drain cap (closure) is done using an external lever to prevent spillage of sewer contents on the ground or on the person operating the assembly. Furthermore, the Sewer Connector Assembly has the additional advantages that:

it can be easily installed on the sewer outlet end of any recreational vehicle unit;

it provides a sealed closure at the outlet end of the recreational vehicle while traveling;

it can be manufactured of durable plastics or other materials for an extended service life;

it can be disassembled at any time so that parts subject to wear such as seals or o-rings can be easily replaced;

it provides an additional measure of environmental protection by preventing excess spillage of sewer contents on the ground while connecting to and disconnecting from public sewer/dump stations;

it provides a sewer connector that can be universally adapted to all existing and new recreational vehicles.

Although the description above contains many specifics, these should not be construed as limiting the scope of the invention but as merely providing illustrations of some of the presently preferred embodiments of this invention. For example, the closure could be operated by a different type lever system, which could also be operated from the outside of the assembly.

Thus the scope of the invention should be determined by the appended claims and their legal equivalents, rather than by the examples given.

What is claimed is:

1. A connector assembly for a sewer pipe system of a recreational vehicle having a holding tank for waste and/or waste water and a discharge pipe having an outlet end through which waste and/or waste water is discharged from the holding tank, the connector assembly comprising:

an adaptor body which is connectable to the discharge pipe of a sewer pipe system of a recreational vehicle and wherein the body includes a passageway through which waste and/or waste water can be conducted from the outlet end of the discharge pipe and a cavity disposed to one side of the passageway so that the interior of the cavity is in communication with the interior of the passageway;

a closure member which is connected to the body of the adaptor for movement relative thereto between a closed position at which the passageway of the body is closed by the closure member and an open position at which the passageway of the body is open and the closure member is at least partially disposed within the cavity of the cavity-defining means;

the body of the adaptor including an abutment surface which encircles the passageway therein and is arranged so as to face the closure member when the closure member is in its closed position; and means for biasing the closure member toward the abutment surface when the closure member is in its closed position to thereby seal the passageway of the adaptor body, the biasing means adapted to be actuated after the closure member is moved to its closed position so that after moving the closure member to its closed position and then actuating the biasing means, the closure member is urged toward the abutment surface to thereby seal the passageway of the body.

2. The connector assembly as defined in claim 1 wherein the biasing means includes a movable member which is attached to the adapter body for movement toward and away from a side of the closure member opposite the abutment surface between a first condition at which the closure member is permitted to move between its open and closed positions unobstructed by the movable member and a second condition at which the movable member is positioned closer to the abutment surface so that when the closure member is positioned in its first condition and the movable member is thereafter moved to its second condition, the closure member is urged by the movable member toward the abutment surface to thereby seal the passageway of the adapter body.

3. The connector assembly as defined in claim 2 wherein the movable member and the adapter body include cooperating threads which permit the movable member to be rotated relative to the adapter body for moving the movable member between its first and second conditions.

4. The connector assembly as defined in claim 3 further comprising a transition member which is interposed between the movable member and the side of the closure member opposite the abutment surface and which cooperates with the adapter member so that as the movable member is rotated relative to the adapter body between its first and second conditions, the transition member moves linearly toward and away from the closure member.

5. The connector assembly as defined in claim 4 wherein one of the adapter body and the transition member includes a detent and the other of the adapter body includes means defining a guide track within which the detent is received so that as the movable member is rotated relative to the adapter body between its first and second conditions, the transition member is moved linearly toward and away from the closure member as the detent is guided along the length of the guide track.

6. The connector assembly as defined in claim 1 further comprising a sealing member which is interposed between the closure member and the abutment surface when the closure member is positioned in its closed position so that when the closure member is positioned in its closed position and is biased by the biasing means toward the abutment surface, the sealing member is compressed between the closure member and the abutment surface.

7. The connector assembly as defined in claim 1 wherein the closure member is in the form of a plate which spans the passageway when the closure member is in the closed condition, and the biasing means includes a movable member which is attached to the adapter body for movement relative thereto between a first condition at which the closure member is permitted to move unobstructed by the movable member between the open and closed positions and a second condition at which the movable member is positioned closer to the abutment surface so that when the closure member is positioned in its closed position and the movable member is thereafter moved to its second condition, the closure member is pressed against the abutment surface by the movable member.

8. The connector assembly as defined in claim 1 wherein the closure member is connected to the adapter body for pivotal movement relative thereto between its open and closed positions.

9. The connector assembly as defined in claim 8 further comprising a handle connected to the closure member which permits the closure member to be manually pivoted between its open and closed positions.

10. The connector assembly as defined in claim 1 wherein the passageway of the adapter body has an outlet end which is disposed downstream of the closure member when the closure member is in its closed position and the connector assembly further includes a connecting portion encircling the outlet end of the adapter body passageway to which a hose can be attached for routing waste and/or waste water which is discharged from the holding tank from the outlet end of the discharge pipe.

11. A waste drain connector assembly for the outlet end of a sewer pipe system of a recreational vehicle, the connector assembly comprising:

an adaptor body having a passageway, and the passageway having an interior, an inlet end which is connectable to the outlet end of a sewer pipe system of a recreational vehicle and an outlet end, the adaptor body further including means providing a cavity disposed to one side of the passageway wherein the cavity has an interior which communicates with the interior of the passageway;

a closure member having two opposite sides and which is mounted within the adaptor body for movement between a first position at which the closure member is positioned across so as to shut off the passageway and a second position at which the closure member is at least partially withdrawn into the interior of the cavity so as to open the passageway;

the adaptor body further defining an internal abutment surface which encircles the passageway thereof and is arranged along the passageway so as to face one side of the closure member when the closure member is positioned in its first position; and means for biasing the closure member toward the abutment surface when the closure member is positioned in its first position to thereby seal the passageway of the adaptor body, the biasing means adapted to be actuated after the closure member is moved to its first position so that after moving the closure member to its first position and then actuating the biasing means, the closure member is urged toward the abutment surface to thereby seal the passageway of the body.

12. The connector assembly as defined in claim 11 wherein the biasing means includes a movable member which is connected to the adapter body for movement relative thereto between a first condition at which the closure member is permitted to move unobstructed by the movable member between the first position and the second position and a second condition at which the movable member is moved toward the closure member on the side thereof opposite the abutment surface so that when the closure member is positioned in its first position and the movable member is thereafter moved to its second condition, the closure member is urged by the movable member toward the abutment surface to thereby seal the passageway of the adapter body.

13. The connector assembly as defined in claim 12 wherein the movable member and the adapter body include cooperating threads which permit the movable member to be rotated relative to the adapter body for moving the movable member between its first and second conditions.

14. The connector assembly as defined in claim 13 wherein a transition member is interposed between the movable member and the closure member and cooperates with the adapter member so that as the movable member is rotated relative to the adapter body between its first and second conditions, the transition member moves linearly toward and away from the closure member.

15. The connector assembly as defined in claim 14 wherein one of the adapter body and the transition member includes a detent and the other of the adapter body includes means defining a guide track within which the detent is received so that as the movable member is rotated relative to the adapter body between its first and second conditions, the transition member is moved linearly toward and away from the closure member as the detent is guided along the length of the guide track.

16. The connector assembly as defined in claim 11 further comprising a sealing member which is interposed between the closure member and the abutment surface when the closure member and the abutment surface when the closure member is positioned in its first position so that when the closure member is positioned in its first position and is biased by the biasing means toward the abutment surface, the sealing member is compressed between the closure member and the abutment surface.

17. The connector assembly as defined in claim 11 wherein the closure member is in the form of a plate which spans the passageway when the closure member is in its first position, and the biasing means includes a movable member which is attached to the adapter body for movement relative thereto between a first condition at which the closure member is permitted to move unobstructed by the movable member between the open and closed positions and a second condition at which the movable member is positioned closer to the abutment surface so that when the closure member is positioned in its first position and the movable member is thereafter moved to its second condition, the closure member is pressed against the abutment surface by the movable member.

18. The connector assembly as defined in claim 11 wherein the closure member is connected to the adapter body for pivotal movement relative thereto between its first and second positions.

19. The connector assembly as defined in claim 18 further comprising a handle connected to the closure member which permits the closure to be manually pivoted between its first and second positions.

20. The connector assembly as defined in claim 11 wherein the passageway of the adapter body has an outlet end which is disposed downstream of the closure member when the closure member is in its first position and the connector assembly further includes a connecting portion encircling the outlet end of the adapter body passageway to which a hose can be attached for routing waste and/or waste water which is discharged from the outlet end of the sewer pipe system.

* * * * *